United States Patent

Hajzler et al.

[11] Patent Number: 5,523,681
[45] Date of Patent: Jun. 4, 1996

[54] BEARING SEAL WITH DATA SENSOR AND AN INTERNAL REINFORCEMENT HAVING AN INSULATING FILM AND A CONDUCTIVE TRACK DISPOSED THEREON

[75] Inventors: Christian Hajzler, Poisy; Fernand Peilloud, Alby Chef Lieu, both of France

[73] Assignee: The Torrington Company, Torrington, Conn.

[21] Appl. No.: 278,785

[22] Filed: Jul. 22, 1994

[30] Foreign Application Priority Data

Nov. 4, 1993 [FR] France ................................ 93 13112

[51] Int. Cl.$^6$ ........................... G01D 3/48; F16C 41/04
[52] U.S. Cl. ........................... 324/174; 384/448
[58] Field of Search ............... 324/207.25, 207.2, 324/207.21, 207.24, 207.22, 173, 174; 384/446, 448

[56] References Cited

U.S. PATENT DOCUMENTS

| | | | |
|---|---|---|---|
| 4,811,603 | 3/1989 | Bitetti | 73/493 |
| 5,026,178 | 6/1991 | Ballhaus | 384/448 |
| 5,145,379 | 9/1992 | Benktander et al. | 384/448 |
| 5,195,830 | 3/1993 | Caillault et al. | 384/448 |
| 5,372,435 | 12/1994 | Genero et al. | 384/448 |
| 5,388,916 | 2/1995 | Ohtsuki et al. | 384/448 |
| 5,393,146 | 2/1995 | Ishikawa et al. | 324/173 |

FOREIGN PATENT DOCUMENTS 2574501  6/1986  France .

Primary Examiner—Sandra L. O'Shea
Assistant Examiner—Roger Phillips
Attorney, Agent, or Firm—John C. Bigler

[57] ABSTRACT

A seal with internal reinforcement is mountable on a stationary ring of a bearing, an insulating film with conductive tracks being fixed to the reinforcement. A sensor element, for sensing an encoder element carried by a rotating ring of the bearing, contacts the insulating film and the conductive tracks. Constitutive material of the seal covers at least a portion of the reinforcement and the insulating film and provides protection for the conductive tracks and sensor element. Connecting devices for passing wiring through the reinforcement are also described.

9 Claims, 3 Drawing Sheets

BEARING SEAL WITH DATA SENSOR AND AN INTERNAL REINFORCEMENT HAVING AN INSULATING FILM AND A CONDUCTIVE TRACK DISPOSED THEREON

BACKGROUND OF THE INVENTION

This invention relates generally to a bearing assembly with a data sensor and, more particularly, to a seal with a sensor element for mounting on a fixed ring of a bearing.

French Patent No. 2,574,501 describes a bearing seal and a bearing in which the sensor device consists of a support plate carrying a contact assembly to which the sensor and the feeder terminals are connected.

When the sensor device carries a Hall-effect probe, the sensor element has a reduced size. However, the Hall-effect element is sensitive and must be protected, jointly with its connections, by a housing that increases the space required by the sensor device. Such a housing cannot be mounted on bearings having an internal diameter of the inner ring of less than 20 mm or having an insufficient radial separation between the respective flanks of the stationary ring and the rotating ring.

French Patent No. 2,655,735 describes a sensor device consisting of a flexible circular film that carries a conducting circuit. Such a sensor device must be mounted on a bearing with a predetermined diameter. Moreover, it is known that the resolution of the signal delivered by the sensor device depends on the arrangement of the conducting circuit and consequently on the dimension of the bearing.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a seal with a data sensor for mounting on a stationary ring of a bearing in proximity to an encoder element carried by a rotating ring of the bearing. The seal includes an internal reinforcement, an insulating film mounted on the reinforcement, and a conductive track supported by the insulating film. A sensor element is in contact with the insulating film and the conductive tracks. Constitutive material of the seal covers at least a portion of the reinforcement and the insulating film.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
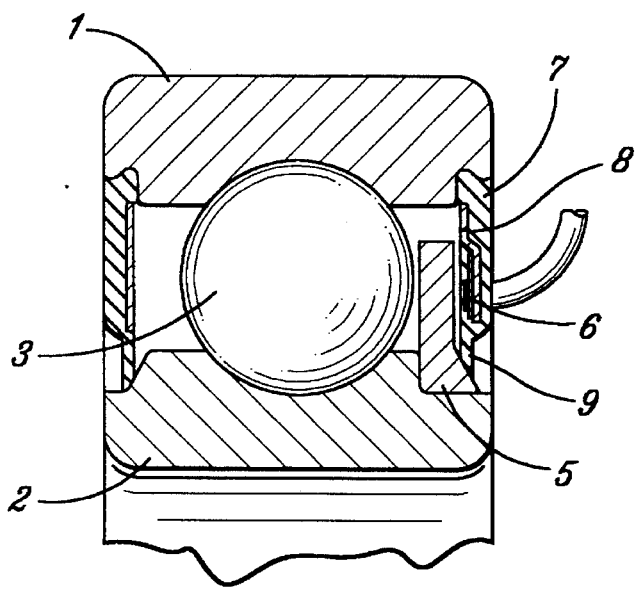
FIG. 1 is a partial cross-sectional view illustrating a ball bearing equipped with a seal according to the present invention.
Figure 2:
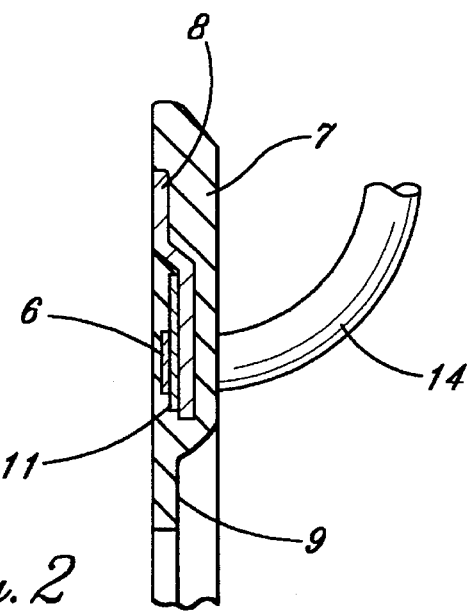
FIG. 2 is an enlarged cross-sectional view of the seal of FIG. 1.

Referring now to the drawings, FIG. 1 illustrates a stationary outer ring 1 and a rotating inner ring 2 that have bearing races in contact with rolling elements 3. The rotating inner ring 2 has an encoding element 5 consisting, for example, of a ring mounted so that it passes in front of a data sensor element 6 carried by a seal 7 with internal reinforcement 8. The seal 7 is carried by the stationary outer fixed ring 1 and has a sealing lip 9 that is in contact with the ring 2.

According to the invention, the sensor element 6 is in contact with insulating film 11 glued or deposited on one side of the reinforcement 8.

Figure 5:
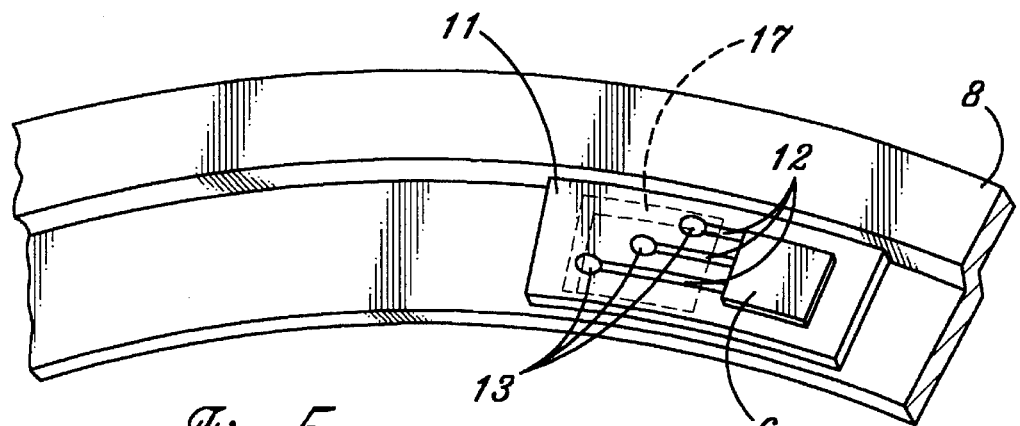
FIG. 5 is a perspective view illustrating a part of the reinforcement of the seal according to one embodiment of the present invention.

FIG. 5 illustrates the part of the reinforcement 8 to which the film 11 is attached. The external surface of the film 11 supports conductive tracks 12 whose extremities are respectively connected to the sensor element 6, that is not covered with any additional housing and consists of an electronic Hall effect probe and electronic components, and to connection terminals 13.

Figure 7:
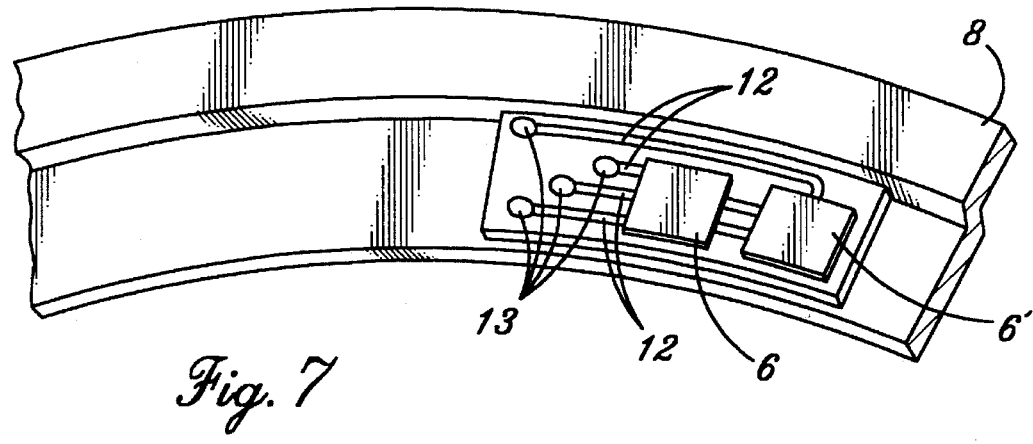

FIG. 7 illustrates an alternative embodiment of the reinforcement 8 in which each sensor element consists of a set of probes 6,6' that are individually connected by conductive tracks 12 to the connection terminals 13 to increase the resolution of the signal or to give data regarding the direction of rotation.

The connection terminals 13 allow the connection of a feeder cable 14. For this purpose, the reinforcement 8 has a cut window 17 located in the proximity of the insulating film 11 which allows the passage of the feeder cable 14 through the reinforcement and connection of the feeder cable 14 to the terminals 13.

Figure 3:
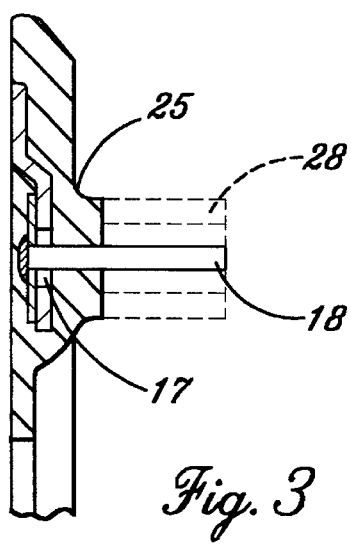
FIG. 3 is a cross-sectional view of a different portion of the seal of FIG. 1.

FIG. 3 shows that connection pins 18, that pass through the window 17, may be provided for the connection of a connector or a set of sockets adjacent to the end of the sheath of cable 14. The connection pins 18 can be uncovered or coated locally by the constitutive material of the seal in the form of a lateral sleeve 28, carried by one side of the seal as shown in phantom in FIG. 3, or they can be connected by soldering them to the cable 14. Alternatively, the connection pins 18 may be partially protected by a projection 25, against which a connector can be braced.

Figure 4:
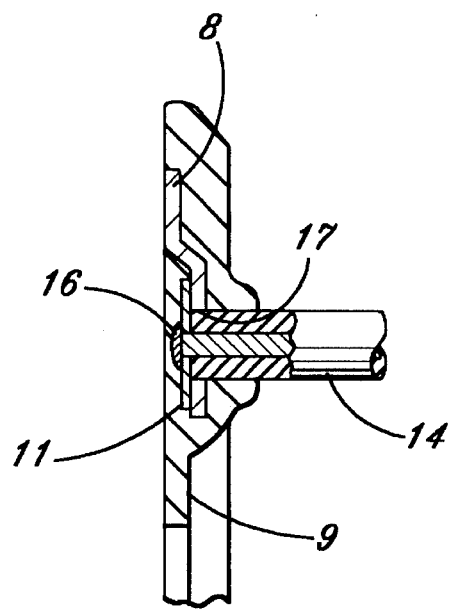
FIG. 4 is a cross-sectional view illustrating a variation of the seal of FIG. 1.

FIG. 4 shows that the cable 14 passes through the window 17, and that it may be connected by soldering point 16 to the conductive tracks 12. The assembly formed by the reinforcement 8, the film 11, the sensor 6, the tracks 12, the cable 14 and the soldering points 16 may be compound-filled by the constitutive elastomer of the seal.

According to the embodiment of the reinforcement shown in FIG. 5 or 7, the window 17 is covered by the film 11.

Figure 6:
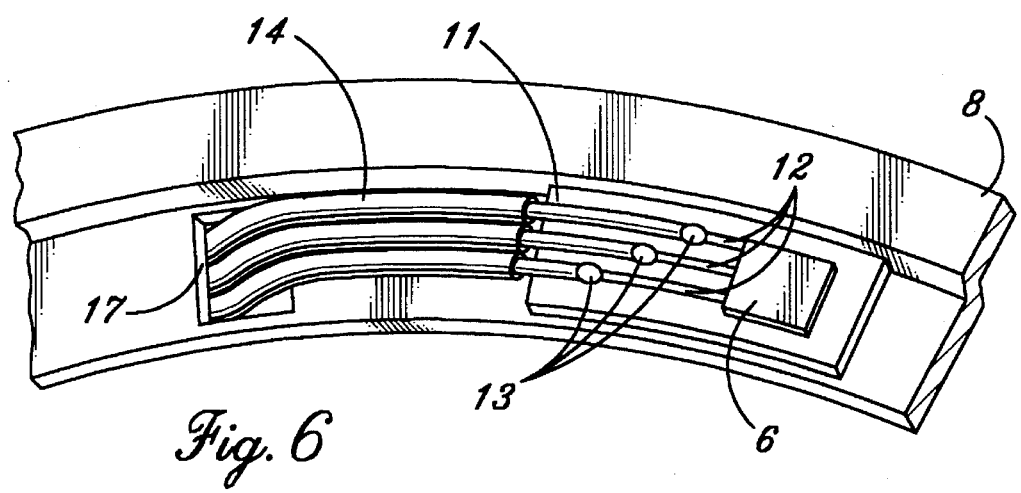
FIGS. 6, 7 and 8 are perspective views illustrating a part of the reinforcement of the seal according to other embodiments of the present invention.

According to the example of a reinforcement illustrated in FIG. 6, the window 17 is shifted circumferentially with respect to the film 11.

Figure 8:
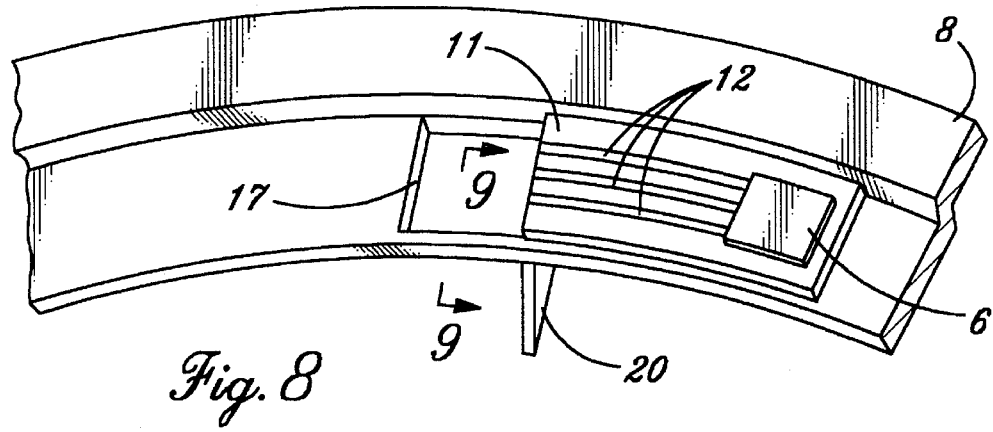
Figure 9:
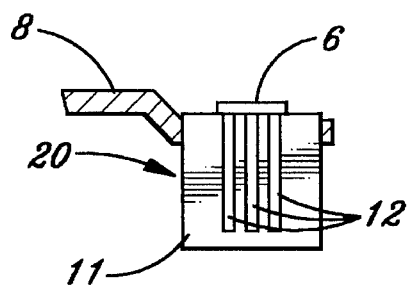
FIG. 9 is a sectional view of the reinforcement of the seal of one embodiment of the present invention along the line IX—IX of FIG. 8.

FIGS. 8 and 9 describe an alternative embodiment of the reinforcement 8 in which an axial extension of the conductive tracks 12 is obtained at the level of a blade terminal 20 contiguous with the edge of the window 17. The blade terminal 20 is shaped to match the cut of the window and is covered by the insulating film 11 that supports the tracks 12. The blade terminal 20 in this way fulfills the function of a connection means.

Figures 10, 11:
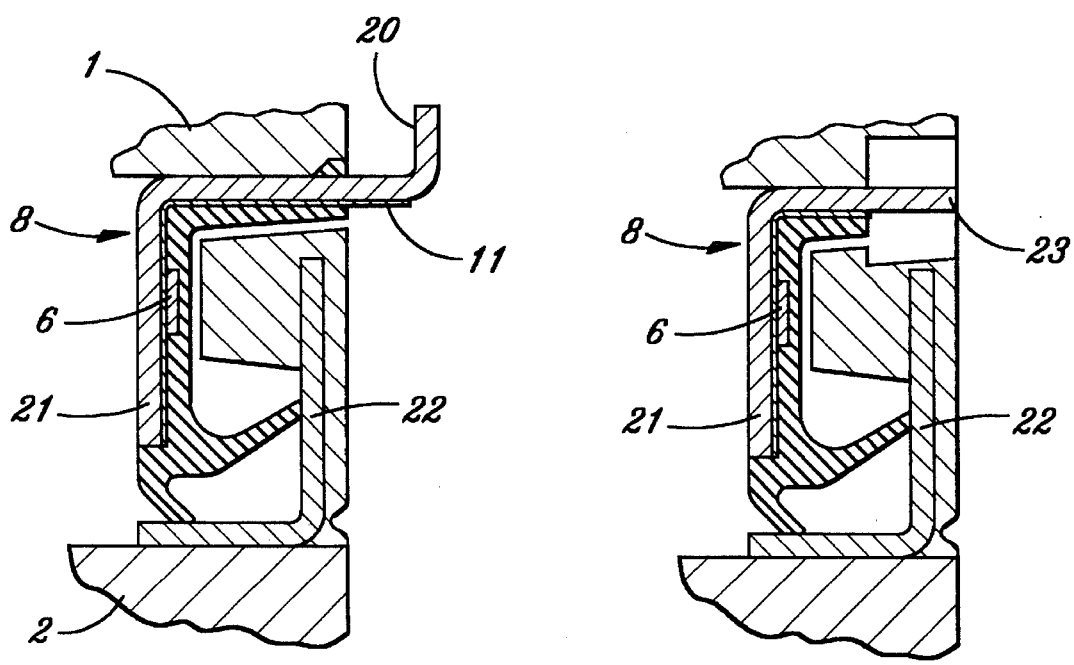
FIGS. 10 and 11 are cross-sectional views illustrating two additional embodiments of a bearing equipped with a seal according to the present invention.

FIGS. 10 and 11 illustrate seals whose reinforcement 8 includes a fixed wing 21, that is mounted on the stationary outer ring 1 and positioned toward the interior of the bearing, and a movable wing 22, that is mounted on the rotating inner ring 2 and positioned toward the interior of the bearing. Film 11 extends along the reinforcement 21 and along a blade terminal, such as 20, or along an edge 23 of said reinforcement. The film 11 is covered according to the different embodiments of the reinforcement by the constitutive material of the seal, but the constitutive material does not extend along the external edge 23 or along the blade terminal 20 for the purpose of facilitating the connection with a cable.

Without exceeding the scope of the invention it is clear that the sensor element 6 can be formed of two Hall-effect components for the purpose of increasing the resolution of the signal. Additional components such as resistors or diodes allow the completion of the processing of this signal.

The present invention provides a bearing assembly whose data sensor is protected by the constitutive material of the seal without a separate housing requiring additional space.

According to the invention, the sensor element is in contact with an insulating film that supports conductive tracks and electronic components mounted jointly on the reinforcement of the seal and covered by the constitutive material of the seal. The seal, so manufactured, provides effective protection for the sensitive Hall-effect sensor element and allows simplified manufacturing because the coating of the sensitive element and of the connection means can be provided during the manufacture of the seal.

Having described the invention, what is claimed is:

1. A seal with a data sensor for mounting on a stationary ring of a bearing in proximity to an encoder element carried by a rotating ring of the bearing, the seal comprising:
   a reinforcement member;
   an insulating film mounted on the reinforcement member;
   conductive tracks supported by the insulating film;
   a sensor element in contact with the insulating film and the conductive tracks; and
   a sealing member made of constitutive material and covering at least a portion of the reinforcement member and at least a portion of the insulating film.

2. The seal according to claim 1, wherein the conductive tracks are connected to at least one Hall-effect element and by connection terminals to a feeder cable.

3. The seal according to claim 1, further comprising electrical connecting means for providing an electrical connection to the conductive tracks and wherein the reinforcement member provides a window located in proximity to the insulating film such that the electrical connecting means may pass through the reinforcement member.

4. The seal according to claim 3, wherein the electrical connecting means includes a blade terminal covered by the insulating film and wherein the reinforcement member window has an edge that conforms to the blade terminal.

5. The seal according to claim 3, wherein the connecting means includes lateral pins.

6. The seal according to claim 3 wherein the constitutive material of the seal locally coats the wiring and connecting means.

7. The seal according to claim 3, wherein sides of the connecting means supports a lateral connection the sealing member includes a sleeve that extends laterally with respect to the stationary ring and that supports the electrical connecting means.

8. A bearing with a seal and data sensor, comprising:
   a stationary ring;
   a rotating ring;
   rolling elements in contact with the stationary and rotating rings;
   an encoder element carried by the rotating ring;
   a reinforcement member;
   an insulating film mounted on the reinforcement member;
   a conductive track supported by the insulating film;
   a sensor element in contact with the insulating film and the conductive tracks; and
   a sealing member made of constitutive material and covering at least a portion of the reinforcement member and at least a portion of the insulating film.

9. A seal with a data sensor for mounting on a stationary ring of a bearing in proximity to an encoder element carried by a rotating ring of the bearing, the seal comprising:
   a reinforcement member having a radially directed annular portion including a window;
   an insulating film mounted on the reinforcement member;
   a sensor element mounted over the annular portion of the reinforcement member and in contact with the insulating film;
   conductive tracks supported by the insulating film and extending circumferentially from the sensor element to the window of the reinforcement member; and
   a sealing member made of constitutive material and covering at least a portion of the reinforcement member.

\* \* \* \* \*